*Bartlett & Morris,*
*Lathe Tool.*
№ 39,789.  Patented Sep. 8, 1863.
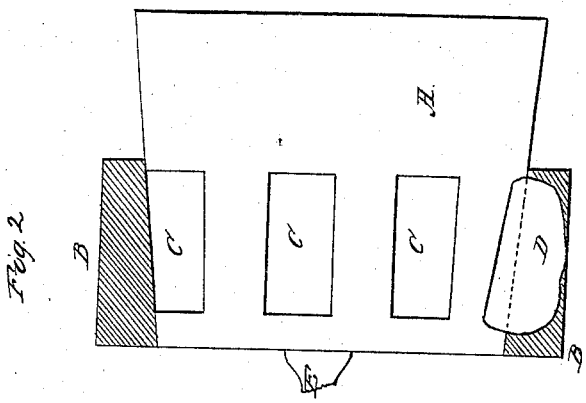
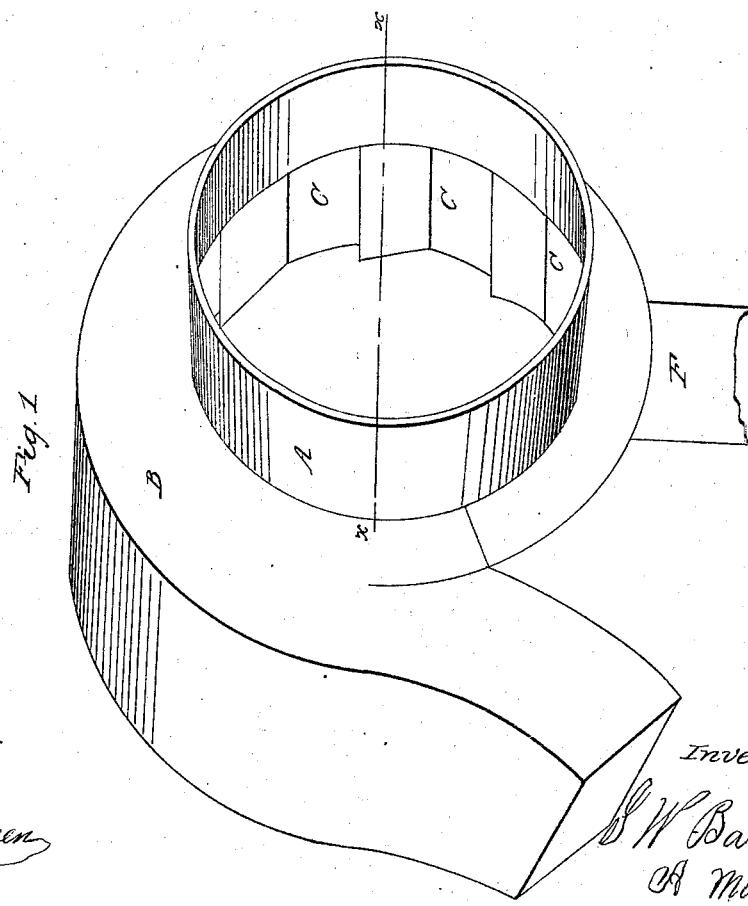
Witnesses
J. J. Parker
Warner Green
Inventors
J. W. Bartlett
A. Morris

UNITED STATES PATENT OFFICE.

JOHN W. BARTLETT, OF HARMAR, AND A. MORRIS, OF MARIETTA, OHIO.

SELF-CLEANING CHUCK.

Specification forming part of Letters Patent No. 39,789, dated September 8, 1863.

*To all whom it may concern:*

Be it known that we, JOHN W. BARTLETT, of the town of Harmar, and A. MORRIS, of the city of Marietta, both in the county of Washington and State of Ohio, have invented a new and useful Self-Cleaning Chuck; and we hereby declare that the following is a clear and full description of the same, reference being had to the annexed drawings, making a part of this specification, in which—

Figure 1 is a perspective view of the chuck. Fig. 2 is longitudinal section through the center of the chuck and fan-chamber on the dotted line $x\ x$.

The object of our self-cleaning chuck for turning buckets, tubs, &c., is to carry away the dust from the turner, and also to keep the chuck free from chips or dust that would interfere with the adjusting of the vessel for turning.

Our self-cleaning chuck is made in the ordinary form for turning the insides of buckets, &c., but is longer and has six openings cut through the back end, about one-half the length of the chuck, and are about one-twelfth of the diameter in width. These openings may be made of any desired shape to accomplish the object. At the back edges of these openings and parallel therewith on the outside of the chuck are fans made of sheet metal. These fans are made of any desired size to produce a strong current of air sufficient for the purposes aforesaid. They extend a little beyond each side of the opening. Around this part of the chuck is a fan-chamber of ordinary form, but hinged at the front edge, so that it can be turned back, leaving the upper part of the chuck exposed to full view.

We will now refer to our chuck by letters of reference to the drawings.

Letter A in Fig. 1 represents the main body of our chuck; B, the fan-chamber. C C C is the opening in the chuck. D in Fig. 2 are fans, (only one shown;) E, shaft; F, in Fig. 1, standard of fan-chamber. This description will enable any person acquainted with the art to see that when motion is given to the chuck A the fans D D D passing rapidly through the chamber B, a strong current of air is produced through the chuck A, openings C C C, and through the fan-chamber B, carrying all the light matter from the front to any place that may be desired by a box or spout attached to the end of the chamber B, thus taking all the dust from the operator.

After having thus described our chuck, what we claim as new, and desire to secure by Letters Patent, is—

The fans D D D and openings C C C, or their equivalent, in combination with the chuck A, in the manner and for the purposes set forth.

This specification signed and witnessed this 6th day of July, A. D. 1863.

J. W. BARTLETT.
A. MORRIS.

Witnesses:
J. J. PARKER,
WARNER GREEN.